United States Patent [19]
Clarke et al.

[11] Patent Number: 5,444,320
[45] Date of Patent: Aug. 22, 1995

[54] ELECTRIC MOTOR WITH BRUSH RETAINER

[75] Inventors: Michael T. Clarke, Lake Odessa; Dennis G. Reid, Lansing, both of Mich.

[73] Assignee: Eaton Stamping Company, Eaton Rapids, Mich.

[21] Appl. No.: 145,255

[22] Filed: Oct. 29, 1993

[51] Int. Cl.⁶ .................. H02K 5/14; H02K 13/00
[52] U.S. Cl. ........................... 310/239; 310/242
[58] Field of Search .......... 310/42, 238, 239, 240, 310/242, 247

[56] References Cited

U.S. PATENT DOCUMENTS

| | | |
|---|---|---|
| 2,870,354 | 1/1959 | Antonidis et al. ........... 310/247 |
| 4,293,789 | 10/1981 | King ........................... 310/239 |
| 4,340,831 | 7/1982 | Kuhlmann et al. .......... 310/239 |
| 4,694,214 | 9/1987 | Stewart, Sr. ................. 310/239 |
| 4,866,322 | 9/1989 | Baumeister et al. ......... 310/239 |
| 5,004,943 | 4/1991 | Gagneux ..................... 310/239 |
| 5,006,747 | 4/1991 | Stewart, Sr. ................. 310/239 |
| 5,332,940 | 7/1994 | Kuragaki et al. ............ 310/239 |

FOREIGN PATENT DOCUMENTS

| | | | |
|---|---|---|---|
| 148702 | 7/1985 | European Pat. Off. ......... 310/239 |
| 2625628 | 7/1989 | France ........................... 310/242 |
| 3842223 | 6/1990 | Germany ........................ 310/242 |
| 56-6649 | 1/1981 | Japan ............................. 310/242 |
| 4-46545 | 2/1992 | Japan ............................. 310/42 |

Primary Examiner—Clayton E. LaBalle
Attorney, Agent, or Firm—Lorusso & Loud

[57] ABSTRACT

There is presented an electric motor having a drive shaft, an armature and commutator assembly fixed on the drive shaft, a housing disposed around the assembly, and an endframe fixed to the housing. The endframe is provided with a journal in which is mounted a bearing supporting the drive shaft. Further disposed in the endframe are brushes in contact with a commutator portion of the assembly, and brush tubes for supporting the brushes. A brush retainer is mounted on the journal and has a face portion overlying a face portion of the bearing. The journal is provided with ribs which extend axially of the retainer. The ribs are engaged with the retainer, which is plastic, and hold the retainer in non-rotative fashion with the retainer face portion abutting an end of the commutator portion.

11 Claims, 4 Drawing Sheets

ELECTRIC MOTOR WITH BRUSH RETAINER

BACKGROUND OF THE INVENTION

1. Field of the Invention

The invention relates to electric motors and is directed more particularly to an electric motor having in an endframe portion thereof a brush retainer.

2. Description of the Prior Art

In electric motors, brushes are commonly retained in brush tubes which usually are molded integrally with a plastic endframe portion of the motor. The endframe and brush tubes typically are of a plastic material. The brush tubes are square in cross-section and hollow, somewhat like elevator shafts, in which spring-biased brushes are slidably movable into engagement with the commutator of the motor.

In assembly of such motors, it is common that a coil spring is inserted in a brush tube and, thereafter, a brush, with a shunt attached thereto, is inserted in the brush tube on top of the spring. In shipment and handling prior to assembly, it is sometimes the case that the brush and spring fall out of the open end of the tube. At the final assembly point, the brush and spring must be reinserted and properly positioned in the brush tube. It is on occasion overlooked that the spring is missing. It is usually apparent when the brush is missing, but sometimes the brush is replaced without the absence of the spring having been noticed. In some instances, the shunt will, for a limited time, exercise spring-like properties and hold the brush in a commutator-engaging position. However, the shunt usually cannot maintain its spring-like performance and, in due course, the brush falls away from commutator engagement, terminating proper operation of the motor.

Accordingly, at best, replacement of a missing brush, or both brush and spring, occasions delay in the assembly process, and, at worst, can result in assembly of a faulty motor. There is then, a need for a brush retainer which prevents loss of brushes and brush springs from brush tubes.

When the brushes remain in their proper positions, they still occasion time delays at the assembly point. The brushes, which are under spring pressure urging them toward the open ends of their brush tubes, typically extend beyond the open ends of the brush tubes and must be urged back into the brush tubes fully to allow a commutator to assume its rightful position in the endframe. Operators usually use plier-like tools to spread the brushes apart, to permit insertion of the commutator. Once the commutator is in place, the plier-like tool is removed, allowing the brushes to snap into engagement with the commutator.

In the endframe there is provided means for retaining a bearing which, in turn, retains a portion of the drive shaft of the motor. A face of the bearing, which usually is of metal, receives a metal face of the commutator. In operation, the commutator face moves rotatably against the bearing face and generates noise. In some applications, it is desirable that the motor operate as quietly as possible. For example, in motors for operating automobile power seats, it is necessary that the motor run quietly so as not to introduce irritating noises into the automobile passenger compartment.

Thus, there is a need for means to substantially reduce the noise generated at the commutator-bearing interface.

SUMMARY OF THE INVENTION

It is, therefor, an object of the invention to provide an electric motor having means for retaining the brushes in place in the brush tubes during shipment and/or handling prior to final assembly.

A further object of the invention is to provide such retaining means as will retain the brushes in a position in which receipt of the commutator by the brush tube assembly may be accomplished without having to move the brushes out of the way.

A still further object of the invention is to provide such retaining means which, upon positioning of the commutator in proper brush-engaging position, will thereafter function as a thrust washer disposed between the bearing and the commutator, to provide for reduction of noise occasioned by the operation of the motor.

With the above and other objects in view, as will hereinafter appear, a feature of the present invention is the provision of an electric motor comprising a drive shaft, an armature and commutator assembly fixed on the drive shaft, a housing disposed around the armature and commutator assembly, magnet means disposed between the armature and commutator assembly and the housing, and an endframe fixed to the housing. There is provided in the endframe a journal and a bearing mounted in the journal, the bearing supporting the drive shaft. Further disposed in the endframe are brush means in contact with a commutator portion of the assembly, and brush tubes for slidably retaining the brush means and for retaining spring means urging the brush means into engagement with the commutator. The motor is characterized by a brush retainer mounted on the journal and having a face portion overlying a face portion of the bearing. The journal is provided with ribs on an exterior wall thereof and extending axially thereof. The retainer is of plastic and the journal ribs and plastic retainer are configured such that the retainer is held on the journal by the ribs in a non-rotative fashion with the retainer face portion abutting an end of the commutator portion.

In accordance with a further feature of the invention, there is provided an endframe assembly for an electric motor, the assembly comprising a housing member, a journal formed in the housing member, and a bearing mounted in the journal for supporting a drive shaft of the motor. In the endframe there is disposed a brush assembly including a cylindrically-shaped central portion, brush tubes extending radially outwardly from the central portion, a brush slidably disposed in each of the brush tubes, and a spring disposed in each of the brush tubes for urging the brush toward an open end of the brush tube for engaging a commutator portion of the motor. The endframe assembly is characterized by a cylindrically-shaped brush retainer mounted in the central portion and positioned so as to abut the brushes to prevent movement of the brushes out of their respective brush tubes, and so as to be movable onto the journal axially thereof to disengage from the brushes, to permit the brushes to engage the motor commutator portion.

The above and other features of the invention, including various novel details of construction and combinations of parts, will now be more particularly described with reference to the accompanying drawings and pointed out in the claims. It will be understood that the particular devices embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENT

Figure 1:
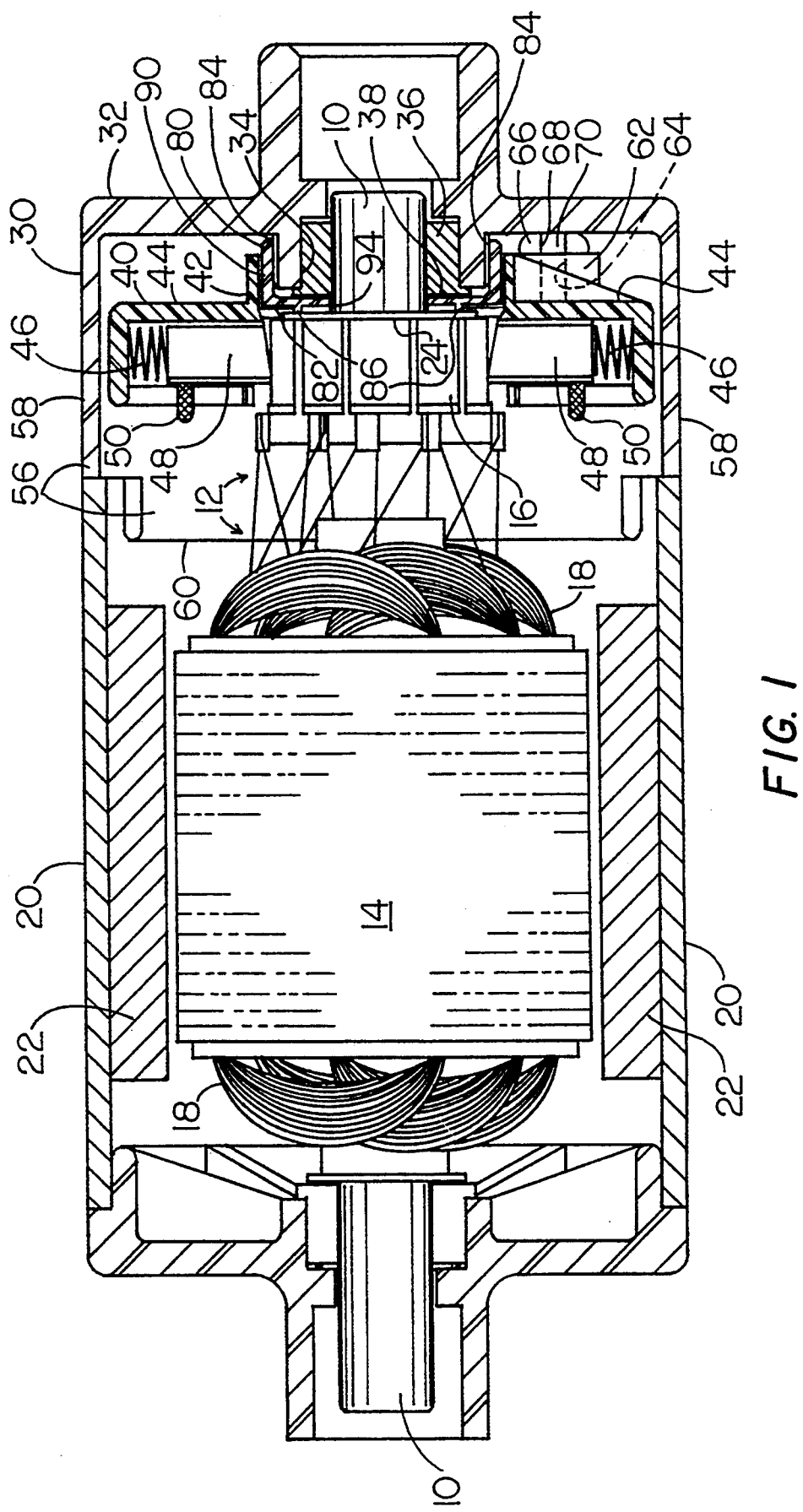
FIG. 1 is a partly side elevational, partly sectional, view of one form of motor illustrative of an embodiment of the invention.
Figure 2:
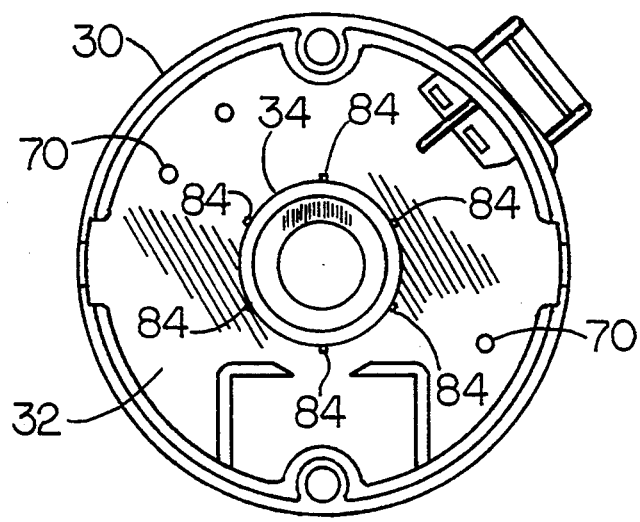
FIG. 2 is an elevational view of an endframe portion of the motor shown in FIG. 1, taken from the open end of the endframe.
Figure 3:
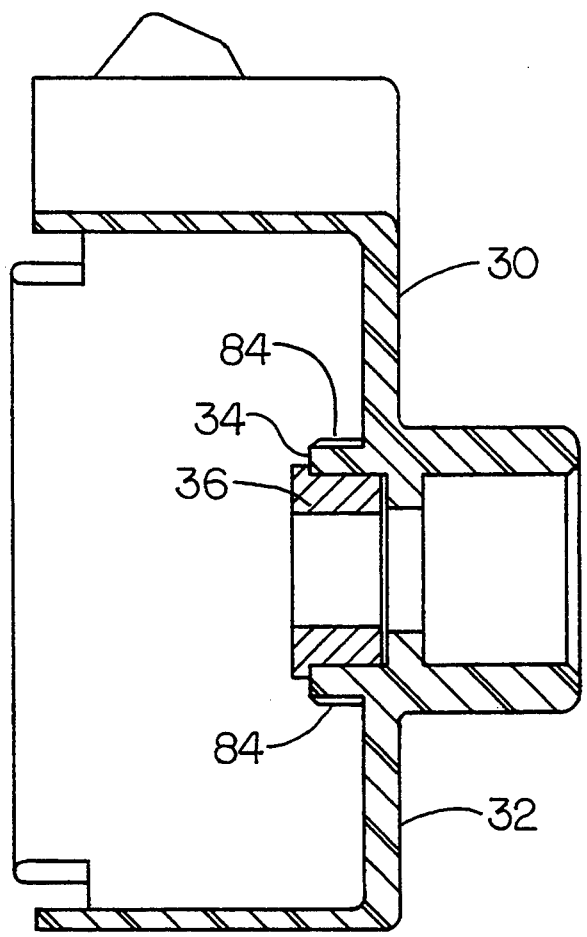
FIG. 3 is a sectional view of the endframe of FIG. 2.

Referring to FIG. 1, it will be seen that the illustrative motor includes a drive shaft 10. Fixed to the drive shaft 10 is an armature and commutator assembly 12, including an armature 14, a commutator 16, and appropriate windings 18.

A metal housing shell 20, preferably of steel, is disposed around the armature 14. Permanent magnets 22 are disposed between the housing shell 20 and the armature 14 and are secured to the housing shell.

An endframe 30 of noise-absorbing plastic material, is fixed to the housing shell 20. The endframe 30 has formed in a substantially closed end 32 a journal 34 (FIGS. 1-6) for retaining a bearing 36 which, in turn, supports the drive shaft 10.

Figure 4:
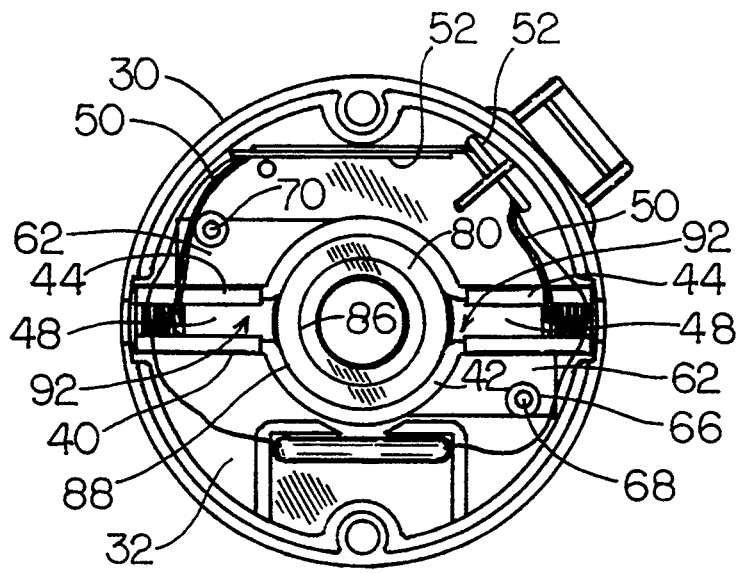
FIG. 4 is similar to FIG. 2, but shows the endframe portion with additional components therein.
Figure 5:
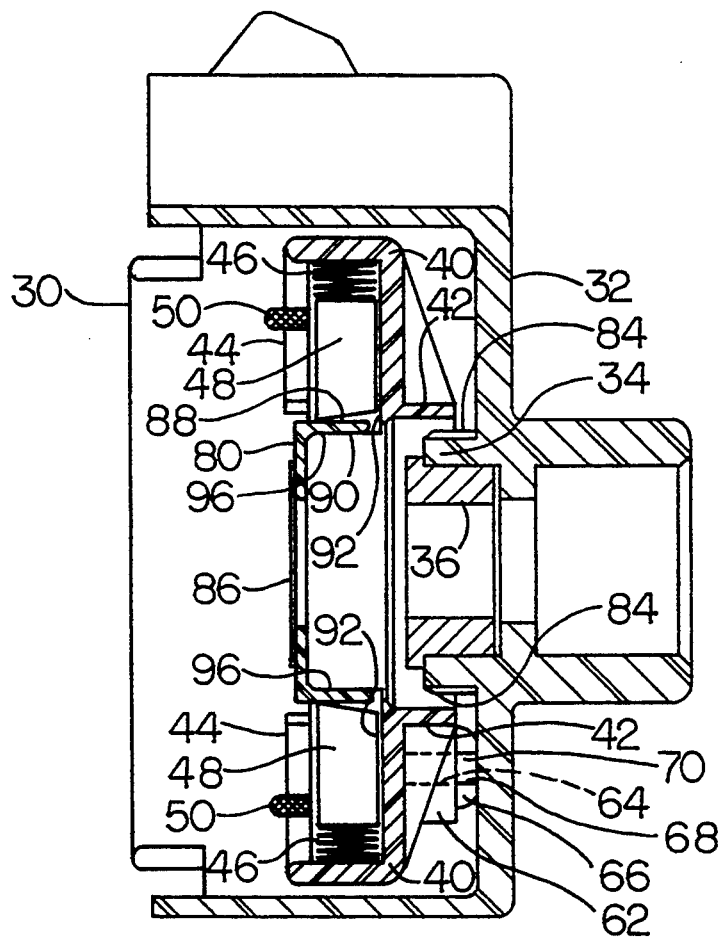
FIG. 5 is similar to FIG. 3 but shows the endframe portion with additional components therein.
Figure 6:
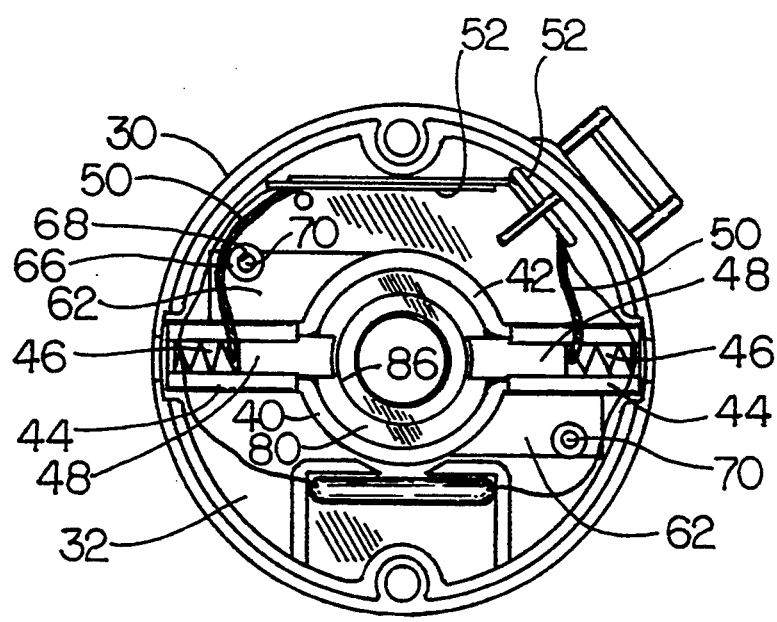
FIG. 6 is similar to FIG. 4, but shows the endframe portion with components in altered positions.

Disposed in the endframe 30 is a discrete brush card 40 (FIGS. 1 and 4-6) which comprises a cylindrically-shaped central portion 42 configured to retain the commutator 16 and to be disposed concentrically around the journal 34 (FIG. 1). Extending radially from the central portion 42 are opposed brush tubes 44 (FIGS. 1 and 4-6). The central portion 42 and the brush tubes 44 are of plastic and may be formed integrally. Each of the brush tubes 44 has disposed therein a coil spring 46 and a brush 48, the spring 46 biasing the brush 48 into engagement with the commutator 16 disposed centrally of the brush card central portion 42 (FIG. 1). Each brush 48 has attached thereto a conductive wire lead, or shunt 50, the other end of which is connected to a terminal 52 (FIGS. 4 and 6).

Referring again to FIG. 1, it will be seen that the endframe 30 extends axially of the motor a sufficient distance to provide a plastic shell housing 56, comprising a side wall portion 58 of the endframe 30, around the commutator 16. The side wall portion 58 of the endframe 30 extends towards the armature 14 such that the commutator 16 is disposed fully within the plastic endframe 30 and is axially spaced from an open end 60 of the endframe 30 and from the metal shell 20. Thus, the noise-absorbing plastic shell housing 56 extends well beyond either end of the commutator to absorb radiated noise generated by the commutator-brush interface.

As may be seen in FIGS. 1 and 4-6, the brush card 40 is provided with flat tabs 62 having orifices 64 (FIGS. 1 and 5) therethrough. Elastomeric grommets 66 are mounted on the tabs 62 and in and around the orifices 64, the grommets 66 having openings 68 therein which are aligned, respectively, with the orifices 64.

In assembly of the endframe 30 and brush card 40, the grommets 66 of the brush card 40 are aligned with posts 70 extending from the closed end 32 of the endframe (FIGS. 1 and 5) to securely lock the brush card 40 to the endframe 30, but with the brush card isolated from the endframe by the elastomeric grommets. Thus, the noise generated at the interface of the brushes 48 and commutator 16 is not transmitted to the endframe, but, instead, is radiated from the commutator and, to a large degree, absorbed by the endframe side wall 58 and endframe end wall 32.

Referring again to FIG. 1, it will be seen that in the endframe 30 there is disposed a collar member 80, referred to as a "brush retainer" for reasons to be made clear hereinafter. The brush retainer 80 is mounted on the journal 34 and is provided with a face portion 82 overlying a face portion 38 of the bearing 36. The face portion 82 of the retainer 80 extends inwardly from an edge of a cylindrically-shaped wall portion 90 of the retainer 80 and defines a central opening 94 in which is disposed the motor shaft 10. The journal 34 is provided with ribs 84 upstanding therefrom and extending axially thereof. The retainer 80 is of a plastic material which receives the ribs 84 such that the retainer 80 is held on the journal 34 in a non-rotative fashion. The retainer face portion 82 abuts a phenolic endplate 24 of the commutator 16. From the retainer face portion 82 there protrudes an annular ring 86 molded integrally with the retainer face portion 82. The ring 86 is customarily referred to as a "rub ring." As the commutator 16 rotates in operation, the commutator endplate 24 rides on the rub ring 86. Inasmuch as the retainer 80, including the rub ring 86, is of plastic, the interface between the phenolic endplate 24 and the retainer 80 generates little noise.

Thus, the elongated endframe 30, absorbing noise from the commutator-brush interfaces, the isolated brush card 40, and the plastic rub ring 86, cooperate to provide a motor which, in operation, runs very quietly.

The brush retainer serves still another valuable purpose. In assembly of the endframe 30, including the brush card and related components, the retainer 80 is placed in the brush card central portion 42 such that an exterior surface 88 of the central portion cylindrically-shaped wall 90 blocks open ends 92 of the brush tubes 44 to prevent loss of the brushes 48 through the open ends (FIGS. 4 and 5). The spring-biased brushes 48 bear against the surface 88 of the wall 90 to hold the retainer 80 in place. The endframe 30 may then be shipped to an assembly location, or otherwise handled prior to final motor assembly, without fear of brush loss prior to assembly.

Upon final assembly, the commutator 16 of the motor is inserted in the brush card central portion 42, pushing the retainer 80 from the position shown in FIGS. 4 and 5 to the position shown in FIGS. 1 and 6. An interior surface 96 of the retainer cylindrically-shaped wall 90 engages the ribs 84 on the journal 34, but may be moved axially, along the length of the ribs 84. At this point the retainer 80 changes functionally from a "brush retainer" (FIGS. 4 and 5) to a thrust washer (FIGS. 1 and 6). As the retainer 80 is pushed from the brushes 48, the spring-biased brushes snap into position abutting the commutator 16 (FIG. 1).

Accordingly, there is provided a retainer which serves to expedite assembly of the motor, serves to insure against loss of brushes and/or assembly of motors without springs, and serves to reduce noise of operation normally associated with the commutator-bearing interface.

It is to be understood that the present invention is by no means limited to the particular construction herein disclosed an/or shown in the drawings, but also comprises any modifications or equivalents within the scope of the claims.

Having thus described our invention, what we claim as new and desire to secure by Letters Patent of the United States is:

1. An electric motor comprising:
   a drive shaft,
   an armature and commutator assembly fixed on said drive shaft,
   a housing disposed around said assembly,
   a magnet disposed between said assembly and said housing,
   an endframe fixed to said housing, said endframe having therein
      a journal,
      a bearing mounted in said journal and supporting said drive shaft,
      a brush in contact with a commutator portion of said assembly,
      brush tubes for slidably retaining said brush, and for retaining a spring urging said brush into engagement with said commutator portion, and
   a brush retainer mounted on said journal and having a face portion overlying a face portion of said bearing,
   said journal having ribs on an exterior wall thereof and extending axially thereof,
   said retainer being of plastic,
   said journal ribs and said plastic retainer being configured such that said retainer is held on said journal by said ribs in non-rotative fashion,
   said retainer face portion abutting an end of said commutator portion.

2. The motor in accordance with claim 1 wherein said brush retainer is provided with a rub ring on said face portion thereof for, contact with said motor commutator portion.

3. The motor in accordance with claim 1 wherein said brush retainer is provided with a cylindrically-shaped wall portion, said face portion of said retainer extending inwardly from an edge of said wall portion and defining a central opening in which is disposed said motor drive shaft.

4. The motor in accordance with claim 3 wherein an interior surface of said retainer wall portion is engaged with said journal ribs so as to prevent rotation of said retainer on said journal.

5. The motor in accordance with claim 4 wherein there is disposed in said endframe a brush card having a cylindrically-shaped central portion encircling said commutator portion, said brush tubes extending outwardly from said central portion, an exterior surface of said retainer wall portion being adjacent an interior surface of said central portion and removed from said brush.

6. The motor in accordance with claim 5 wherein said retainer is provided with an annular protrusion extending from said retainer face portion and in contact with an end of said motor commutator portion.

7. An endframe assembly for an electric motor, the assembly comprising:
   a housing member,
   a journal formed in said housing member and provided with ribs on an exterior surface thereof,
   a bearing mounted in said journal for supporting a drive shaft of said motor,
   a brush assembly disposed in said housing member and comprising
      a cylindrically-shaped central portion, and brush tubes extending radially outwardly from said central portion,
      a brush slidably disposed in each of said brush tubes,
      a spring disposed in each of said brush tubes for urging said brush toward an open end of said brush tube for engaging a commutator portion of said motor, and
      a cylindrically-shaped brush retainer of plastic material mounted in said central portion and positioned so as to abut said brushes and thereby prevent movement of said brushes out of their respective brush tubes, and so as to be movable onto said journal axially, to disengage from said brushes to permit said brushes to engage said motor commutator portion, an interior surface of said retainer being engageable with said ribs to prevent rotation of said retainer on said journal.

8. The assembly in accordance with claim 7 wherein said ribs extend axially of said journal and permit axial movement of said retainer on said journal.

9. The assembly in accordance with claim 7 wherein an exterior surface of said retainer is engaged with said brushes.

10. The assembly in accordance with claim 9 wherein said retainer is provided with a face portion for overlying a face portion of said bearing upon movement of said retainer to disengage from said brushes.

11. The assembly in accordance with claim 10 wherein said retainer face portion is provided with an annular protrusion extending therefrom for engaging an end of said motor commutator portion.

* * * * *